United States Patent
Kato et al.

(10) Patent No.: US 11,658,317 B2
(45) Date of Patent: May 23, 2023

(54) METHOD OF INSPECTION FOR ERRONEOUS ASSEMBLY OF FUEL CELL STACKS

(71) Applicant: HONDA MOTOR CO., LTD., Tokyo (JP)

(72) Inventors: Takashi Kato, Tochigi (JP); Toru Ikeda, Tochigi (JP); Naohiro Kawakita, Tochigi (JP); Keiichi Iio, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 17/184,612

(22) Filed: Feb. 25, 2021

(65) Prior Publication Data

US 2021/0265647 A1 Aug. 26, 2021

(30) Foreign Application Priority Data

Feb. 26, 2020 (JP) .............................. JP2020-029992

(51) Int. Cl.
*H01M 8/04664* (2016.01)
*H01M 8/0438* (2016.01)
(Continued)

(52) U.S. Cl.
CPC ... *H01M 8/04679* (2013.01); *H01M 8/04388* (2013.01); *H01M 8/04395* (2013.01);
(Continued)

(58) Field of Classification Search
CPC ............. H01M 8/04559; H01M 8/241; H01M 8/04552; H01M 8/2483; H01M 8/04664;
(Continued)

(56) References Cited

U.S. PATENT DOCUMENTS 7,001,687 B1 * 2/2006 Gaines ................ H01M 8/0273
429/510
2016/0211543 A1 7/2016 Okabe et al.

FOREIGN PATENT DOCUMENTS

JP 2015069737 A * 4/2015 .......... H01M 8/0273
JP 2015069737 A 4/2015

OTHER PUBLICATIONS

English translation of JP-2015069737-A (Year: 2015).*

* cited by examiner

*Primary Examiner* — Ula C Ruddock
*Assistant Examiner* — Sarika Gupta
(74) *Attorney, Agent, or Firm* — CKC & Partners Co., LLC

(57) ABSTRACT

The invention provides a method of inspection for erroneous assembly of a fuel cell stack which allows for determination of whether the fuel cell stack has been properly assembled without depending on the appearance of the fuel cell stack. The erroneous assembly inspection method inspects for erroneous assembly of a fuel cell stack that is produced by stacking power generation cells and dummy cells in proper power generation positions and proper dummy positions. The erroneous assembly inspection method measures a pressure difference in anode gas passages and cathode gas passages when gas is supplied at different pressures respectively to an anode gas inlet and a cathode gas inlet of the workpiece to determine whether or not the workpiece is in a third erroneous assembly state including a first abnormal cell in which a dummy MEA and a power generation separator are assembled.

20 Claims, 9 Drawing Sheets

(51) Int. Cl.
  *H01M 8/241* (2016.01)
  *H01M 8/04537* (2016.01)
(52) U.S. Cl.
  CPC ... *H01M 8/04432* (2013.01); *H01M 8/04559* (2013.01); *H01M 8/241* (2013.01)
(58) Field of Classification Search
  CPC ....... Y02E 60/50; Y02P 70/50; G01R 31/378; G01R 31/36; G01R 31/389; G01R 31/392
  See application file for complete search history.

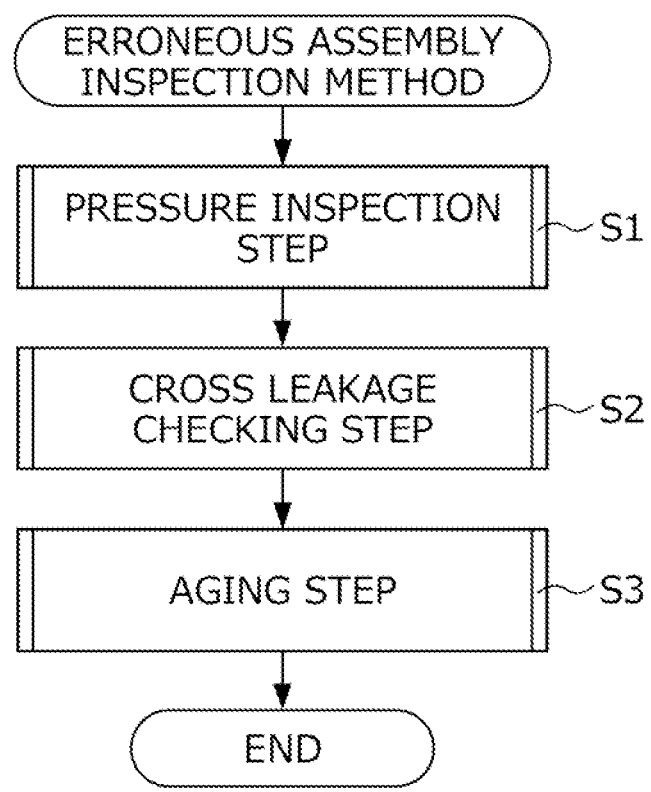

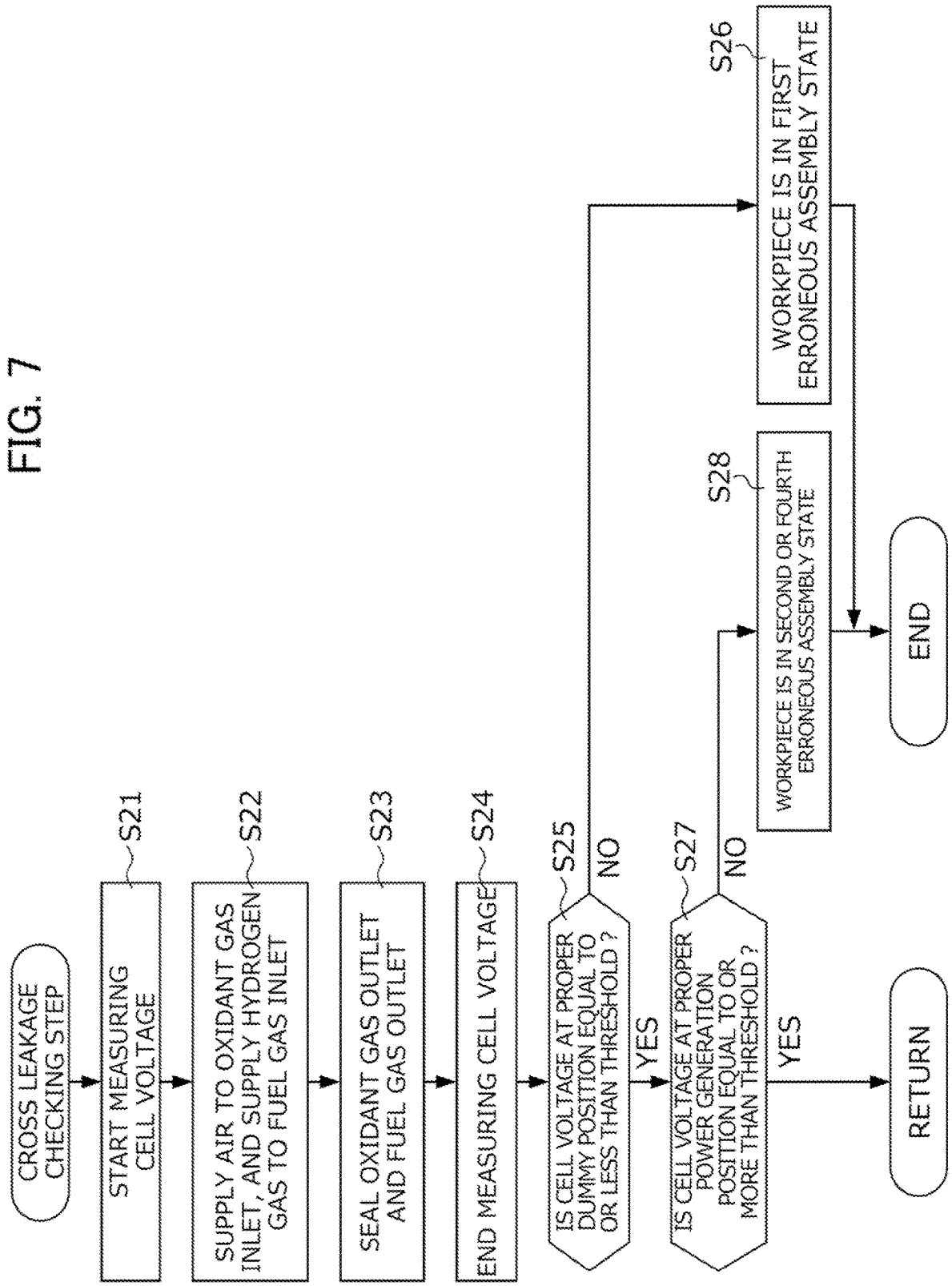

METHOD OF INSPECTION FOR ERRONEOUS ASSEMBLY OF FUEL CELL STACKS

This application is based on and claims the benefit of priority from Japanese Patent Application No. 2020-029992, filed on 26 Feb. 2020, the content of which is incorporated herein by reference.

BACKGROUND OF THE INVENTION

Field of the Invention

The present invention relates to a method of inspection for erroneous assembly of fuel cell stacks. More specifically, the present invention relates to a method of inspection for erroneous assembly of a fuel cell stack produced by stacking a power generation cell and a dummy cell in predetermined regular positions.

Related Art

A fuel cell stack is produced by stacking multiple layers of fuel cells composed of a combination of a membrane electrode assembly (MEA) and a separator. Further, in recent years, there has been proposed a fuel cell stack including not only a plurality of power generation cells having a power generation function, but also a plurality of dummy cells that do not have a power generation function (see, for example, Patent Document 1).

In order for a fuel cell stack including such dummy cells to suitably exert its function, the power generation cells and dummy cells need to be laminated in proper positions determined in advance. In the invention described in Patent Document 1, the dummy cells and the power generation ceils differ in appearance, allowing for easy visual confirmation of whether the power generation cells and dummy cells are laminated in their respective proper positions.

Patent Document 1: Japanese Unexamined Patent Application, Publication No. 2015-69737

SUMMARY OF THE INVENTION

However, making the power generation cells and dummy cells differ in appearance as in the technique shown in Patent Document 1 may take a lot of time and effort. In addition, when producing the dummy cell by combining a dummy MEA having a different function than the MEA of the power generation cell with a dummy separator having a different function than the separator, it is not possible to determine based on differences in appearance whether or not the power generation cell and the dummy cell have been properly assembled, even if the power generation cell and the dummy cell are made to look different from each other. That is to say, while there may be cases in which the MEA of the power generation cell and the dummy separator of the dummy cell are assembled, or the dummy MEA of the dummy cell and the separator of the power generation cell are assembled, it is difficult to visually confirm such erroneous assembly using the technique shown in Patent Document 1.

It is an object of the present invention to provide a method of inspection for erroneous assembly of fuel stacks that allows for determination of whether or not the fuel stack has been properly produced regardless of appearance.

(1) A method of inspection for erroneous assembly according to the present invention is a method for inspection for erroneous assembly of a fuel cell stack produced by stacking, in predetermined proper power generation positions and proper dummy positions, a power generation cell produced by assembling a power generation MEA and a power generation separator having passages for supplying gas to an anode and a cathode of the power generation MEA, and a dummy cell produced by assembling a dummy MEA having different functions than the power generation MEA and a dummy separator having different functions than the power generation separator, the method including the steps of: measuring at least one of a pressure in anode gas passages and cathode gas passages of a workpiece which is a laminated body of a plurality of cells when gas is supplied to an anode gas inlet and a cathode gas inlet, of the workpiece, a cell voltage of each cell when gas is supplied to the anode gas inlet and the cathode gas inlet, and a cell voltage of each cell when gas is supplied to the anode gas inlet and the cathode gas inlet and an external voltage is applied to electrodes of the workpiece; and based on a result of the measurement, determining whether or not the workpiece is in any of a first erroneous assembly state in which the power generation cell is laminated in the proper dummy position, a second erroneous assembly state in which the dummy cell is laminated in the proper power generation position, a third erroneous assembly state including a first abnormal cell in which the dummy MEA and the power generation separator are assembled, and a fourth erroneous assembly state including a second abnormal cell in which the power generation MEA and the dummy separator are assembled.

(2) In this case, it is preferable, by measuring a cell voltage of each cell when an anode gas and a cathode gas are supplied respectively to the anode gas inlet and the cathode gas inlet, to determine whether or not the workpiece is in the first or the second erroneous assembly state.

(3) In this case, it is preferable that the dummy MEA has a function of transmitting gas between the anode and the cathode, and the dummy separator does not have a function of supplying gas to the anode.

(4) In this case, it is preferable, by measuring a pressure difference between the anode gas passages and the cathode gas passages when gas is supplied at different pressures respectively to the anode gas inlet and the cathode gas inlet, to determine whether or not the workpiece is in the third erroneous assembly state.

(5) In this case, it is preferable, by measuring a cell voltage of each cell when anode gas and inert gas are supplied respectively to the anode gas inlet and the cathode gas inlet and an external voltage is applied to the electrodes, to determine whether or not the workpiece is in the fourth erroneous assembly state.

(6) In this case, it is preferable that, after it has been determined that the workpiece is not in the third erroneous assembly state, anode gas and cathode gas are supplied respectively to the anode gas inlet and the cathode gas inlet.

(7) A method of inspection for erroneous assembly according to the present invention is a method of inspection for erroneous assembly of a fuel cell stack produced by stacking, in predetermined proper power generation positions and proper dummy positions, a power generation cell produced by assembling a power generation MEA and a power generation separator having passages for supplying gas to an anode and a cathode of the power generation MEA, and a dummy cell produced by assembling a dummy MEA having different functions than the power generation MEA and a dummy separator having different functions than the power generation separator, the method including: measuring a cell voltage of each cell when anode gas and cathode gas are supplied respectively to an anode gas inlet and a cathode gas inlet of the workpiece which is a laminated body of a plurality of cells to determine whether or not the power generation cell is laminated in the proper dummy position in the workpiece, or whether or not the dummy cell is laminated in the proper power generation position.

(8) A method of inspection for erroneous assembly according to the present invention is a method of inspection for erroneous assembly of a fuel, cell stack produced by stacking, in predetermined proper positions, a power generation cell produced by assembling a power generation MEA and a power generation separator having passages for supplying gas to an anode and a cathode of the power generation MEA, and a dummy cell produced by assembling a dummy MEA which unlike the power generation MEA has a function of transmitting gas between the anode and the cathode and a dummy separator which unlike the power generation separator does not have a function of supplying gas to the anode, the method including: measuring a pressure difference between anode gas passages and cathode gas passages of the workpiece which is a laminated body of a plurality of cells when gas is supplied at different pressures respectively to an anode gas inlet and a cathode gas inlet of the workpiece to determine whether or not the workpiece includes a first abnormal cell in which the dummy MEA and the power generation separator are assembled.

(9) A method of inspection for erroneous assembly according to the present invention is a method of inspection for erroneous assembly of a fuel cell stack produced by stacking, in predetermined proper positions, a power generation cell produced by assembling a power generation MEA and a power generation separator having passages for supplying gas to an anode and a cathode of the power generation MEA, and a dummy cell produced by assembling a dummy MEA which unlike the power generation MEA has a function of transmitting gas between the anode and the cathode and a dummy separator which unlike the power generation separator does not have a function of supplying gas to the anode, the method including: measuring a cell voltage of each cell when anode gas and inert gas are supplied respectively to an anode gas inlet and a cathode gas inlet of the workpiece which is a laminated body of a plurality of cells, and an external voltage is applied to electrodes of the workpiece, to determine whether or not the workpiece includes a second abnormal cell in which the power generation MEA and the dummy separator are assembled.

(1) The present invention measures at least one of a pressure in the anode gas passages and cathode gas passages when gas is supplied to the anode gas inlet and cathode gas inlet of the workpiece, the cell voltage of each cell when gas is supplied to the anode gas inlet and cathode gas inlet, and the cell voltage of each cell when gas is supplied to the anode gas inlet and cathode gas inlet and an external voltage is applied to the electrodes of the workpiece, and, based on the measured result, determines whether or not the workpiece is in any of a first erroneous assembly state, a second erroneous assembly state, a third erroneous assembly state, and a fourth erroneous assembly state. This allows for determination of whether or not the workpiece has been properly produced as a fuel cell stack without depending on the appearance of the workpiece.

(2) When an anode gas and a cathode gas are supplied respectively to the anode gas inlet and cathode gas inlet of the workpiece, the power generation cells generate power, producing a cell voltage, whereas the dummy cells do not produce a cell voltage. The present invention utilizes this by measuring the cell voltage of each cell when anode gas and cathode gas are supplied respectively to the anode gas inlet and cathode gas inlet of the workpiece, in order to determine whether or not a power generation cell is laminated in a proper dummy position in the workpiece, i.e. whether or not the workpiece is in the first erroneous assembly state, or whether or not a dummy cell is laminated in a proper power generation position in the workpiece, i.e. whether or not the workpiece is in the second erroneous assembly state. This allows for determination of whether or not the workpiece is in the first erroneous assembly state or the second erroneous assembly state without depending on the appearance of the workpiece.

(3) In the present invention, dummy MEAs have the function of transmitting gas between the anode and the cathode, and dummy separators do not have the function of supplying gas to the anode. The present invention utilizes such dummy MEAs and dummy separators to make it possible to see a difference in the measured results of the pressure and cell voltage in cases where the workpiece is in the third erroneous assembly state or the fourth erroneous assembly state compared to other cases. Therefore, according to the present invention, it is possible to determine whether or not the workpiece is in the third erroneous assembly state or the fourth erroneous assembly state without depending on the appearance of the workpiece.

(4) Unlike power generation MEAs, dummy MEAs used in dummy cells have the function of transmitting gas between the anode and the cathode, and unlike power generation separators, dummy separators do not have the function of supplying gas to the anode. Therefore, if a first abnormal cell produced by assembling dummy MEAs and power generation separators is present among the plurality of cells constituting the workpiece, i.e. if the workpiece is in the third erroneous assembly state, the anode gas passages and cathode gas passages are short-circuited in this first abnormal cell. Therefore, when gas is supplied at different pressures respectively to the anode gas inlet and cathode gas inlet, the gases will mix in the first abnormal cell, reducing the pressure difference between the anode gas passages and the cathode gas passages. The present invention utilizes this mechanism to allow for determination of whether or not the workpiece is in the third erroneous assembly state without depending on the appearance of the workpiece.

(5) Unlike power generation MEAs, dummy MEAs used in dummy cells have the function of transmitting gas between the anode and the cathode, and unlike power generation separators, dummy separators do not have the function of supplying gas to the anode. Therefore, if a second abnormal cell produced by assembling power generation MEAs and dummy separators is present among the plurality of cells constituting the workpiece, i.e. if the workpiece is in the fourth erroneous assembly state, anode gas will not be supplied to the anodes of the power generation MEAs of the second abnormal cell even if anode gas is supplied to the anode gas inlet of the workpiece. In addition, when there is no anode gas present at the anode of the power generation MEA, resistance is greater than when anode gas is present at the anode of the power generation MEA. Therefore, when an external voltage is applied to a workpiece including such a second abnormal cell, there will be a difference between the cell voltage of the power generation cell, the cell voltage of the dummy cell, and the cell voltage of the second abnormal cell. The present invention utilizes this mechanism by measuring the cell voltage of each cell when anode gas and inert gas are supplied respectively to the anode gas inlet and cathode gas inlet and an external voltage is applied to the electrodes of the workpiece, allowing for determination of whether or not the workpiece is in the fourth erroneous assembly state without depending on the appearance of the workpiece.

(6) If the workpiece is in the third erroneous assembly state as described above, the anode gas passages and cathode gas passages in the first abnormal cell included in the workpiece will be short-circuited. Therefore, in the present invention, anode gas and cathode gas are supplied respectively to the anode gas inlet and cathode gas inlet after it has been determined that the workpiece is not in the third erroneous assembly state, i.e. that the anode gas passages and cathode gas passages of the workpiece are not short-circuited. This makes it possible to prevent anode gas and cathode gas from mixing during inspection.

(7) The present invention measures the cell voltage of each cell when anode gas and cathode gas are supplied respectively to the anode gas inlet and cathode gas inlet of the workpiece to determine whether or not a power generation cell is laminated in a proper dummy position or whether or not a dummy cell is laminated in a proper power generation position in the workpiece. This makes it possible to determine whether or not the power generation cells and dummy cells are laminated in proper positions without depending on the appearance of the workpiece.

In an inspection known as a cross leakage check, changes in cell voltage when anode gas and cathode gas are sealed respectively in the anode gas passages and cathode gas passages of the workpiece are monitored to determine whether there is any leakage of anode gas from the anode side to the cathode side of the power generation cell. According to the present invention, utilizing such a cross leakage check allows for determining not only the presence of leakage but also erroneous assembly.

(8) The present invention measures the pressure difference between the anode gas passages and the cathode gas passages when gas is supplied at different pressures respectively to the anode gas inlet and cathode gas inlet of the workpiece. This allows for determination of whether or not the workpiece includes a first abnormal cell as described above without depending on the appearance of the workpiece.

(9) The present invention measures the cell voltage of each cell when anode gas and inert gas are supplied respectively to the anode gas inlet and cathode gas inlet and an external voltage is applied to the electrodes of the workpiece, allowing for determination of whether or not the workpiece includes a second abnormal cell without depending on the appearance of the workpiece.

In an aging step for improving output of an assembled fuel cell stack, anode gas and inert gas may be supplied respectively to the anode gas passages and cathode gas passages of the workpiece and an external voltage may be applied to the electrodes of the workpiece. According to the present invention, utilizing such an aging step allows for determining whether or not the workpiece includes a second abnormal cell, while improving the output of the workpiece if it does not include a second abnormal cell.

BRIEF DESCRIPTION OF THE DRAWINGS

FIG. 4 is a flowchart showing a specific procedure of a method of inspection for erroneous assembly of a fuel cell stack;

FIG. 7 is a flowchart showing a specific procedure of a cross leakage checking step;

DETAILED DESCRIPTION OF THE INVENTION

A method of inspection for erroneous assembly of a fuel cell stack 1 according to an embodiment of the present invention is described below with reference to the drawings.

Figure 1:
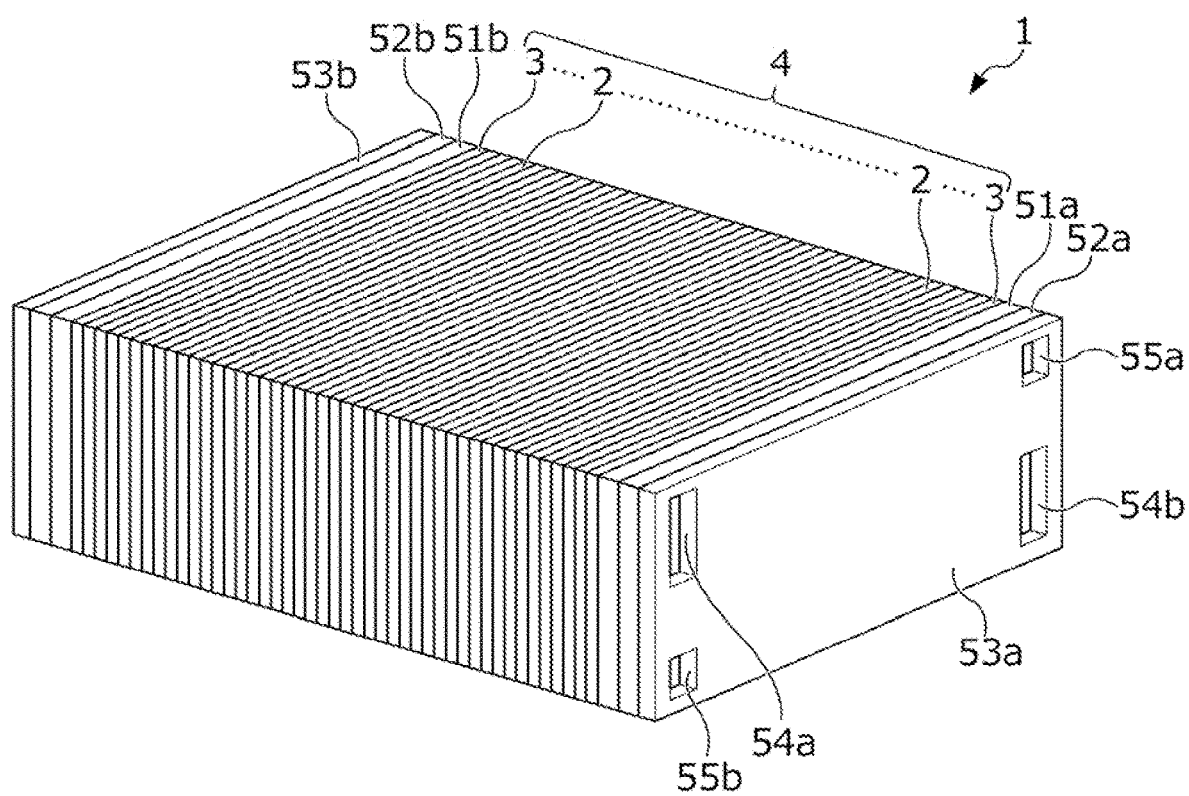
FIG. 1 is a perspective view showing a stack structure of a fuel cell stack according to an embodiment of the present invention.

FIG. 1 is a perspective view showing a stack structure of a fuel cell stack 1. The fuel cell stack 1 includes a laminated body 4 in which a plurality of plate-shaped power generation cells 2 constituting a unit fuel cell and a plurality of plate-shaped dummy cells 3 having a different appearance than the power generation cells 2 are laminated along a lamination direction (the left-to-right direction in FIG. 1), terminal plates 51a, 51b provided at both ends of the laminated body 4 in the lamination direction, insulators 52a, 52b provided at both ends of the terminal plates 51a, 51b in the lamination direction, and end plates 53a, 53b provided at both ends of the insulators 52a, 52b in the lamination direction. With the end plates 53a, 53b acting as end plates, the fuel cell stack 1 is housed within a housing not shown here, with the laminated body 4, the terminal plates 51a, 51b, and the insulators 52a, 52b sandwiched between the end plates 53a, 53b.

The end plate 53a is provided with an oxidant gas inlet 54a in communication with an oxidant gas supply passage of the laminated body 4, an oxidant gas outlet 54b in communication with an oxidant gas discharge passage of the laminated body 4, a fuel gas inlet 55a in communication with a fuel gas supply passage of the laminated body 4, and a fuel gas outlet 55b in communication with a fuel gas discharge passage of the laminated body 4.

When power is generated by the fuel cell stack 1, an oxygen-containing oxidant gas (e.g., air) is supplied to the oxidant gas inlet 54a as a cathode gas, and a hydrogen gas is supplied to the fuel gas inlet 55a as an anode gas.

The laminated body 4 is produced by stacking a plurality of power generation cells 2 and a plurality of dummy cells 3 in respective proper positions. It should be noted that the present embodiment describes a case in which one or more cells of the laminated body 4 on the side of the end plate 53b are dummy cells 3, one or more cells of the laminated body 4 on the side of the end plate 53a are dummy cells 3, and all remaining cells are power generation cells 2, but the present invention is not so limited. The positions at which the dummy cells 3 are provided are not limited to the ends of the laminated body 4. Hereinafter, the proper position of the power generation cell 2, i.e. the position at which the power generation cell 2 is laminated, is referred to as a proper power generation position, and the proper position of the dummy cell 3, i.e. a position at which the dummy cell 3 is laminated, is referred to as a proper dummy position.

Figure 2A:
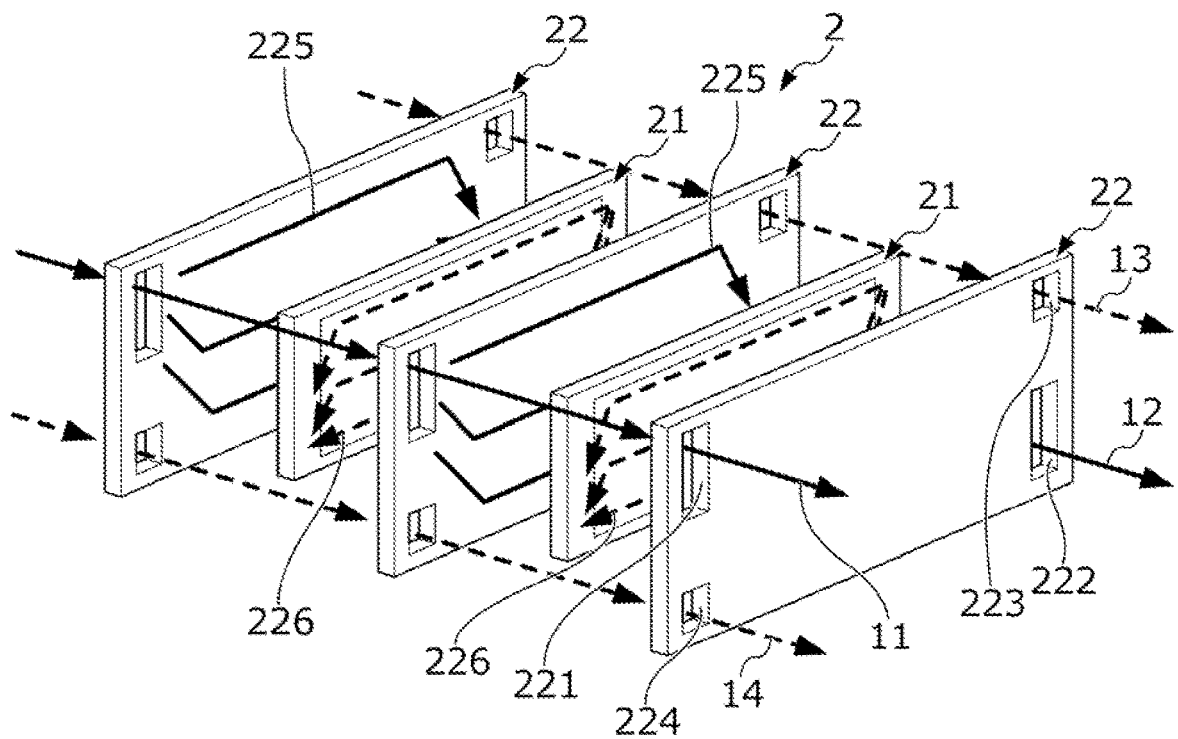
FIG. 2A is an exploded perspective view showing a stack structure of a power generation cell.

FIG. 2A is an exploded perspective view of a stack structure of the power generation cell 2. The power generation cell 2 is produced by assembling, for example, two plate-shaped power generation MEAs 21, 21, and three plate-shaped power generation separators 22, 22, 22 provided on both sides of the power generation MEAs 21, 21. It should be noted that the present embodiment describes a case in which one power cell 2 is composed of two power generation MEAs 21, 21 and three power generation separators 22, 22, 22, but the number of power generation MEAs 21 and the number of power generation separators 22 are not so limited.

Figure 2B:
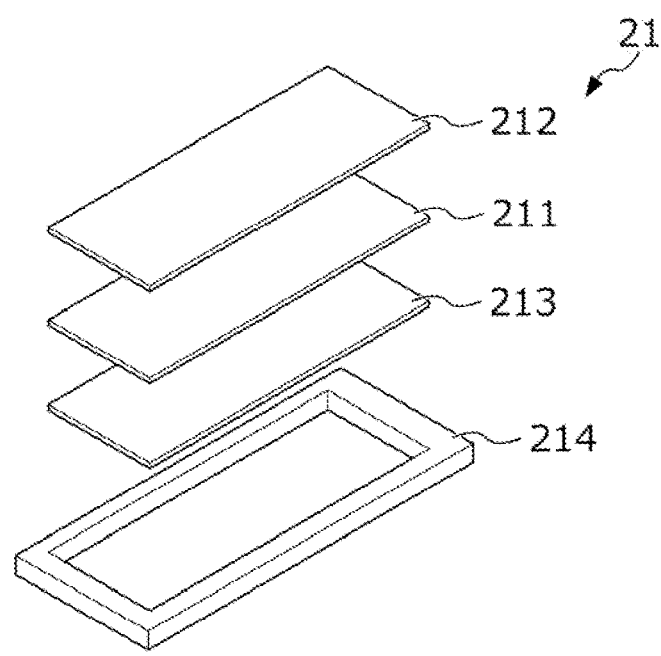
FIG. 2B is an exploded perspective view showing a stack structure of a power generation MEA.

FIG. 2B is an exploded perspective view of a stack structure of the power generation MEA 21. The power, generation MEA 21 includes a plate-shaped polymer electrolyte membrane PEM 211, an anode carbon paper 212 provided to an anode electrode which is one side of the PEM 211, a cathode carbon paper 213 provided to a cathode electrode which is the opposite side of the PEM 211, and a resin frame 214 which holds the anode carbon paper 212, PEM 211, and cathode carbon paper 213 in a laminated state. The PEM 211 is a thin film of, for example, a perfluorosulfonic acid containing water, and has the function of allowing ions to pass through. The power generation MEA 21 does not have the function of transmitting gas between the anode carbon paper 212 constituting the anode and the cathode carbon paper 213 constituting the cathode.

Returning to FIG. 2A, the power generation separator 22 includes an oxidant gas communicating hole 221 constituting part of an oxidant gas supply passage 11, an oxidant gas communicating hole 222 constituting part of an oxidant gas discharge passage 12, a fuel gas communicating hole 223 constituting part of a fuel gas supply passage 13, a fuel gas communicating hole 224 constituting part of a fuel gas discharge passage 14, an oxidant gas supply passage (not shown) that supplies part of the gas flowing in the oxidant gas supply passage 11 along a passage as indicated by arrow 225 in FIG. 2A to the cathode of the MEA 21, and a fuel gas supply passage (not shown) that supplies part of the gas flowing in the fuel gas supply passage 13 along a passage as indicated by arrow 226 in FIG. 2A to the anode of the power generation MEA 21. Gas supplied from the oxidant gas communicating hole 221 of the power generation separator 22 to the cathode of the power generation MEA 21 flows into the oxidant gas discharge passage 12 through the oxidant gas communicating hole 222. In addition, gas supplied from the fuel gas communicating hole 223 of the power generation separator 22 to the anode of the power generation MEA 21 flows into the fuel gas discharge passage 14 through the fuel gas communicating hole 224.

Figure 3A:
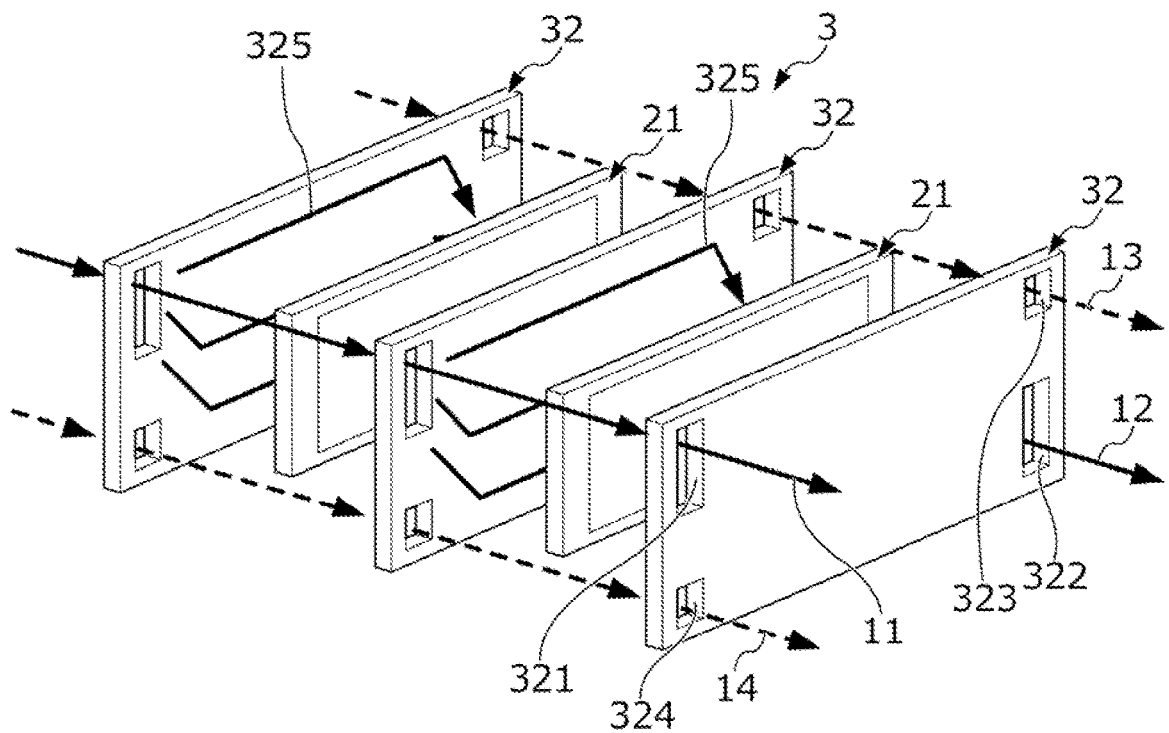
FIG. 3A is an exploded perspective view showing a stack structure of a dummy cell.

FIG. 3A is an exploded perspective view of a stack structure of the dummy cell 3. The dummy cell 3 is produced by assembling, for example, two plate-shaped dummy MEAs 31, 31, and three plate-shaped dummy separators 32, 32, 32 provided on both sides of the dummy MEAs 31, 31. The appearance of the dummy cell 3 produced by assembling the dummy MEAs 31, 31 and dummy separators 32, 32, 32 is approximately identical to the appearance of the power generation cell 2. However, the dummy cell 3 has a different function from the power generation cell 2.

Figure 3B:
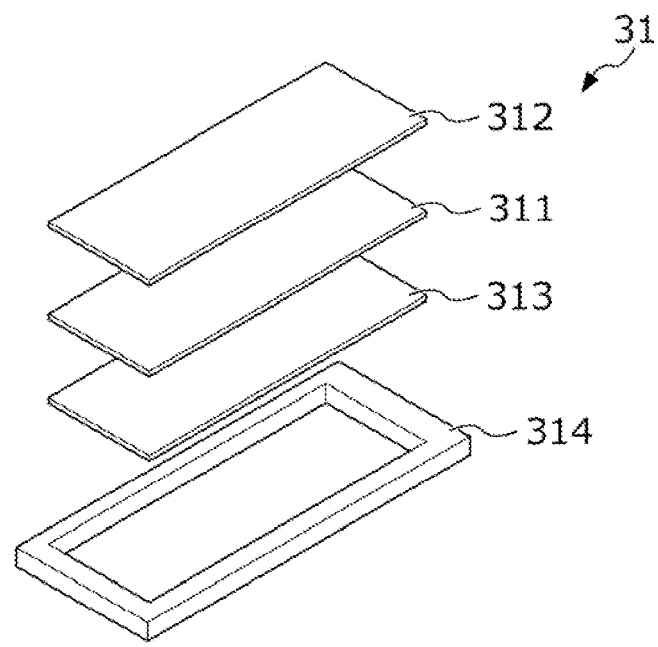
FIG. 3B is an exploded perspective view showing a stack structure of a dummy MEA.

FIG. 3B is an exploded perspective view showing a stack structure of the dummy MEA 31, The dummy MEA 31 includes a plate-shaped dummy carbon paper 311, a dummy anode carbon paper 312 provided to one side of the dummy carbon paper 311, a dummy cathode carbon paper 313 provided to the opposite side of the dummy carbon paper 311, and a resin frame 314 which holds the dummy carbon papers 311, 312, 313 in a laminated state. The dummy MEA 31 is of approximately the same thickness as the aforementioned power generation MEA 21. Hereinafter, the dummy anode carbon paper 312 side of the dummy MEA 31 is referred to as the anode, and the dummy cathode carbon paper -side 313 is referred to as the cathode. In addition, the dummy MEA 31, unlike the power generation MEA 21, has the function of transmitting gas between the anode and the cathode.

Returning to FIG. 3A, the dummy separator 32 includes an oxidant gas communicating hole 321 constituting part of the oxidant gas supply passage 11, an oxidant gas communicating hole 322 constituting part of the oxidant gas discharge passage 12, a fuel gas communicating hole 323 constituting part of the fuel gas supply passage 13, a fuel gas communicating hole 324 constituting part of the fuel gas discharge passage 14, and an oxidant gas supply passage (not shown) that supplies part of the gas flowing in the oxidant gas supply passage 11 along a passage as indicated by arrow 325 in FIG. 3A to the cathode of the dummy MEA 31. Gas supplied from the oxidant gas communicating hole 321 of the dummy separator 32 to the cathode of the dummy MEA 31 flows into the oxidant gas discharge passage 12 through the oxidant gas communicating hole 322. The dummy separator 32, unlike the power generation separator 22, does not have the function of supplying part of the gas flowing through the fuel gas supply passage 13 to the anode of the dummy MEA 31. That is to say, in the dummy cell 3, the fuel gas communicating hole 323 in communication with the fuel gas supply passage 13 is not in communication with the fuel gas communicating hole 324 in communication with the fuel gas discharge passage 14.

Next, a specific procedure of the method of inspection for erroneous assembly of the fuel cell stack 1 having the aforementioned stack structure will be described with reference to FIG. 4 to FIG. 9.

FIG. 4 is a flowchart showing the specific procedure of the method of inspection for erroneous assembly of the fuel cell stack 1. As mentioned above, the laminated body 4 of the fuel cell stack 1 is produced by stacking power generation cells 2 and dummy cells 3 which are similar in appearance, and the appearances of the power generation MEAs 21 and the power generation separators 22 that constitute the power generation cells 2 are respectively similar in appearance to the dummy MEAs 31 and the dummy separators 32 that constitute the dummy cells 3. Therefore, a workpiece produced as a laminated body 4 of a fuel cell stack 1 after going through specific stack production steps may be erroneously assembled in a variety of ways.

In the erroneous assembly inspection method shown in FIG. 4, it is determined whether a workpiece produced through stack production steps is in any of a first to a fourth erroneous assembly state. A first erroneous assembly state refers to a state in which the power generation cell 2 is laminated in the proper dummy position. A second erroneous assembly state refers to a state in which the dummy cell 3 is laminated in the proper power generation position. A third erroneous assembly state refers to a state in which a first abnormal cell, produced by assembling dummy MEAs 31 and power generation separators 22, is laminated in a proper power generation position or a proper dummy position. A fourth erroneous assembly state refers to a state in which a second abnormal cell, produced by assembling power generation MEAs 21 and dummy separators 32, is laminated in a proper power generation position or a proper dummy position.

The erroneous assembly inspection method shown in FIG. 4 includes a pressure inspection step (S1), a cross leakage checking step (S2), and an aging step (S3).

Figure 5:
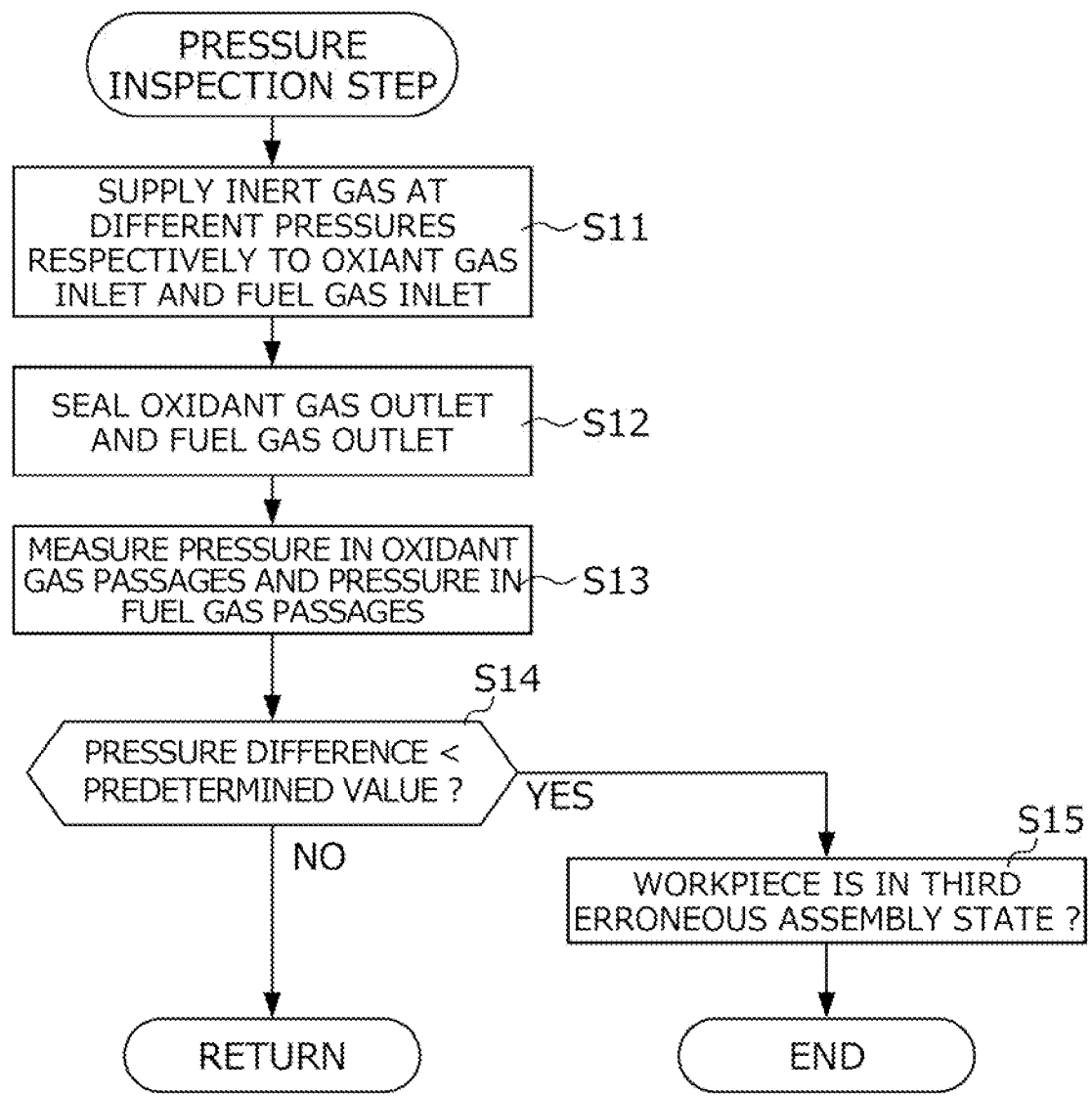
FIG. 5 is a flowchart showing a specific procedure of a pressure inspection step.

FIG. 5 is a flowchart showing a specific procedure of the pressure inspection step. First, at step S11, a worker supplies an inert gas (e.g., nitrogen gas) at different pressures respectively to an oxidant gas inlet 54$a$ and a fuel gas inlet 55$a$ of a workpiece produced through the production steps of the fuel cell stack 1. It should be noted that the present embodiment describes a case in which the pressure of the inert gas supplied to the oxidant gas inlet 54$a$ is lower than the pressure of the inert gas supplied to the fuel gas inlet 55$a$, but the present invention is not so limited. This makes the pressure in the oxidant gas passages of the workpiece lower than the pressure in the fuel gas passages.

At step S12, the worker stops the supply of the inert gas after a predetermined time has passed since starting the supply of the inert gas, and seals the oxidant gas outlet 54$b$ and the fuel gas outlet 55$b$. The step S12 seals inert gas at different pressures respectively in the oxidant gas passages and the fuel gas passages of the workpiece.

Next, at step S13, the worker uses a pressure sensor to measure the pressure in the oxidant gas passages and the fuel gas passages of the workpiece after a predetermined time has passed since sealing the inert gas.

At step S14, the worker determines whether or not the pressure difference between oxidant gas passages and the fuel gas passages is equal to or less than a predetermined value. If the determined result of step S14 is YES, the worker determines that the workpiece is in the third erroneous assembly state (S15), and ends the erroneous assembly inspection method of FIG. 4. Alternatively, if the determined result of step S14 is NO, the worker determines that the workpiece is not in the third erroneous assembly state, and moves on to the cross leakage checking step (S2) of FIG. 4. As described above, it is preferable that the cross leakage checking step and the aging step are not performed on workpieces that have been determined to be in the third erroneous assembly state, and that the cross leakage checking step and the aging step are performed only on workpieces that have been determined not to be in the third erroneous assembly state.

Figure 6A:
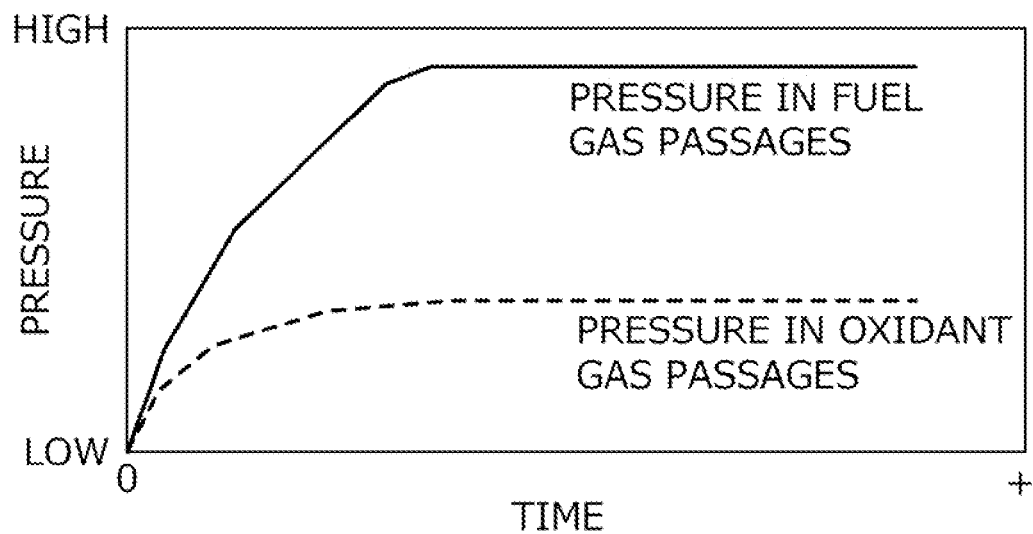
FIG. 6A is a drawing showing a change in pressure in each passage of a workpiece which is not in a third erroneous assembly state.
Figure 6B:
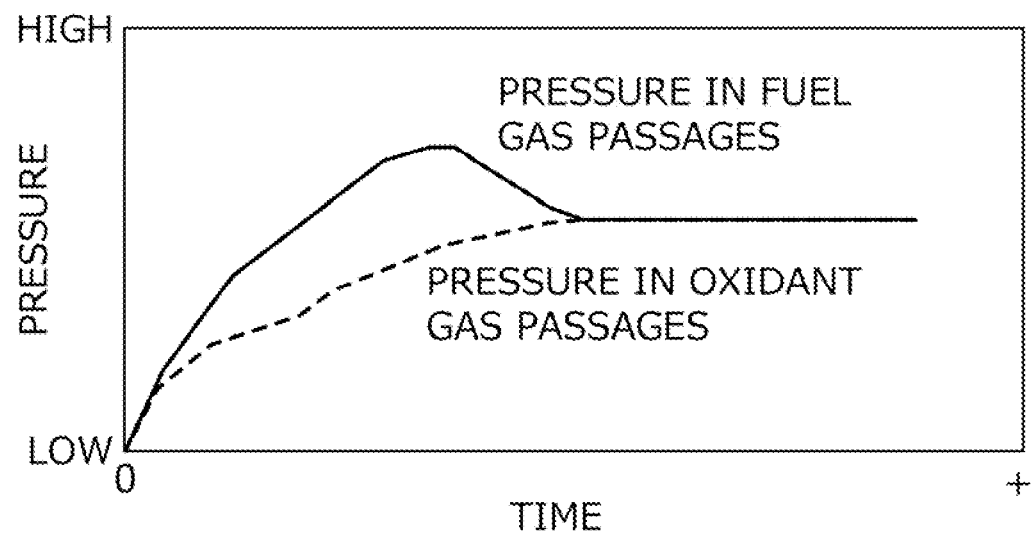
FIG. 6B is a drawing showing a change in pressure in each passage of a workpiece which is in a third erroneous assembly state.

FIG. 6A shows a change in pressure in each passage of a workpiece that is not in the third erroneous assembly state, and FIG. 6B shows a change in pressure in each passage of a workpiece that is in the third erroneous assembly state. As shown in FIG. 6A, when the inert gas is supplied at different pressures respectively to the oxidant gas passages and the fuel gas passages of a workpiece that is not in the third erroneous assembly state, the pressure difference between the passages is maintained even after the predetermined time has passed.

By contrast, if the workpiece is in the third erroneous assembly state, that is to say if part of the plurality of cells constituting the workpiece are first abnormal cells produced by assembling dummy MEAs 31 and power generation separators 22, part of the inert gas supplied to the high -pressure side pole (the anode in the above example) of the dummy MEA 31 of the first abnormal cell will be transmitted to the low-pressure side pole (the cathode in the above example). In other words, the oxidant gas passages and the fuel gas passages of the workpiece in the third erroneous assembly state are short-circuited in the first abnormal cell. Therefore, as shown in FIG. 6B, the pressure difference between the oxidant gas passages and the fuel gas passages in the workpiece that is in the third erroneous assembly state becomes close to 0 after the predetermined time has passed.

FIG. 7 is a flowchart showing a specific procedure of the cross leakage checking step. First, at step S21, the worker uses a cell voltage sensor to start measuring a cell voltage of each cell constituting the workpiece. Here, the cell voltage is measured not only for cells laminated in the proper power generation position, but also for cells laminated in the proper dummy position.

At step S22, the worker supplies air and hydrogen gas respectively to the oxidant gas inlet 54$a$ and the fuel gas inlet 55$a$ of the workpiece that has gone through the pressure inspection step and been determined not to be in the third erroneous assembly state.

At step S23, the worker stops the supply of air and hydrogen gas after a predetermined time has passed since starting the supply of air and hydrogen gas, and seals the oxidant gas outlet 54$b$ and the fuel gas outlet 55$b$. The step S23 seals air inside the oxidant gas passages of the workpiece, and seals hydrogen gas in the fuel gas passages.

At step S24, the worker finishes measuring the cell voltage of each cell after a predetermined time has passed since sealing the air and the hydrogen gas.

At step S25, the worker determines whether or not the cell voltage of the cell laminated in the proper dummy position is equal to or less than a threshold set close to 0. Unlike the power generation cell 2, the dummy cell 3 that is supposed to be laminated in the proper dummy position does not have a power generating function. Therefore, if the determined result of step S25 is NO, the worker determines that the workpiece is in the first erroneous assembly state (S26), more specifically that a power generation cell 2 has been laminated in the proper dummy position, and ends the erroneous assembly inspection method of FIG. 4. Alternatively, if the determined result of step S25 is YES, the worker moves on to step S27.

At step S27, the worker determines whether or not the cell voltage of the cell laminated in the proper power generation position is equal to or more than the threshold. The power generation cell 2 that is supposed to be laminated in the proper power generation position generates power when the cathode is supplied with air and the anode is supplied with hydrogen gas, causing the cell voltage to rise to a predetermined value. By contrast, the dummy cell 3 does not have such a power generating function. Further, in the second abnormal cell produced by assembling power generation MEAs 21 and dummy separators 32, the anode of the power generation MEA 21 is not supplied with hydrogen gas, and thus the cell does not have a power generating function. Therefore, if the determined result of step S27 is NO, the worker determines that the workpiece is in the second erroneous assembly state or the fourth erroneous assembly state (S28), more specifically that a dummy cell 3 or a second abnormal cell has been laminated in the proper power generation position, and ends the erroneous assembly inspection method of FIG. 4. Alternatively, if the determined result of step S27 is YES, the worker moves on to the aging step (S3) of FIG. 4.

Figure 8:
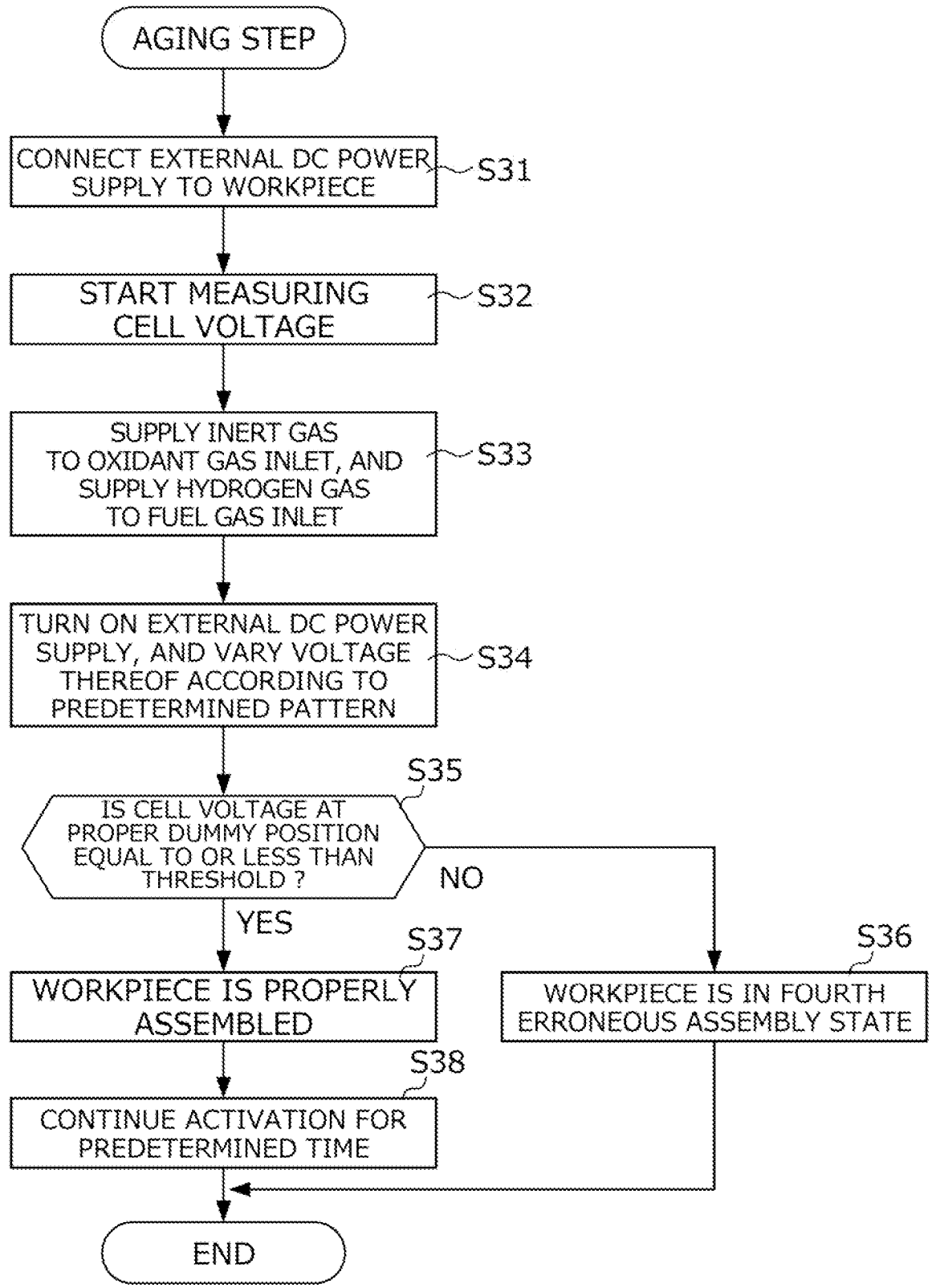
FIG. 8 is a flowchart showing a specific procedure of an aging step.
Figure 9:
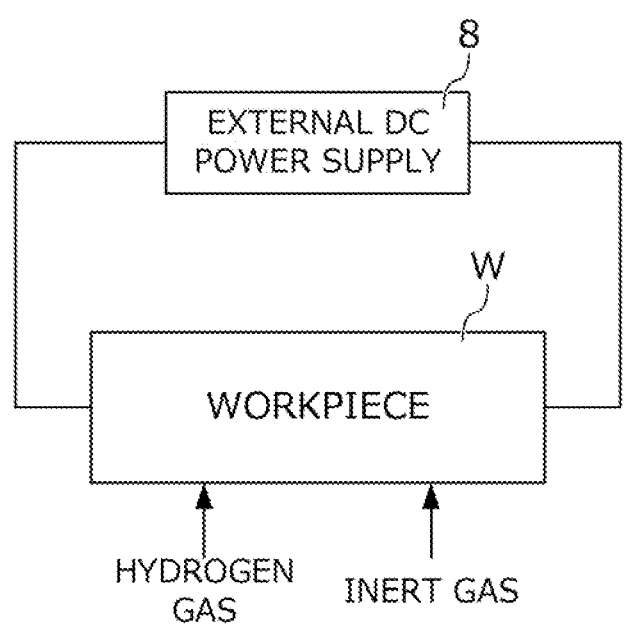
FIG. 9 is a drawing showing a configuration of a circuit used in the aging step.

FIG. 8 is a flowchart showing a specific procedure of the aging step. First, at step S31, as shown in FIG. 9, the worker connects an external DC power supply 8 to the anode and the cathode of the workpiece W.

At step S32, the worker uses a cell voltage sensor to start measuring the cell voltage of each cell constituting the workpiece. Here, the cell voltage is measured not only for cells laminated in the proper power generation position, but also for cells laminated in the proper dummy position.

At step S33, the worker supplies a humidified inert gas (e.g., nitrogen gas) and humidified hydrogen gas respectively to the oxidant gas inlet 54a and the fuel gas inlet 55a of the workpiece that has gone through the cross leakage checking step of FIG. 7.

At step S34, the worker varies the voltage of the external DC power supply 8 according to pattern determined in advance within a specific range while supplying inert gas and hydrogen gas to the workpiece to activate the power generation MEAs 21 of the power generation cells 2 included in the workpiece.

At step S35, the worker determines whether or not the cell voltage of the cell laminated in the proper dummy position is equal to or less than a threshold set close to 0. Unlike the power generation MEA 21, the dummy MEA 31 of the dummy cell 3 that is supposed to be laminated in the proper dummy position does not have a polymer electrolyte membrane. Therefore, if a dummy cell 3 is laminated in the proper dummy position, then the cell voltage will remain close to 0 even if a voltage is applied by the external DC power supply 8 to cause a current to flow as described above.

By contrast, since the second abnormal cell is produced by assembling power generation MEAs 21 and dummy separators 32, hydrogen gas will not be supplied to the anodes of the power generation MEAs 21 of the second abnormal cell even if hydrogen gas is supplied to the fuel gas inlet 55a as described above. In addition, when there is no hydrogen gas present at the anode of the power generation MEA 21, electrical resistance is greater than when hydrogen gas is present at the anode of the power generation MEA 21. Therefore, if such a second abnormal cell is laminated in the proper dummy position, the cell voltage thereof will exceed the aforementioned threshold. Accordingly, if the determined result of step S35 is NO, the worker determines that the workpiece is in the fourth erroneous assembly state (S36), more specifically that a second abnormal cell has been laminated in the proper dummy position, and ends the erroneous assembly inspection method of FIG. 4.

Alternatively, if the determined result of step S35 is YES, the worker determines that the workpiece has been properly assembled (S37), and, after continuing activation of the power generation MEAs 21 of the power generation cells 2 for a predetermined time (S38), ends the erroneous assembly inspection method of FIG. 4.

As described above, the erroneous assembly inspection method shown in FIG. 4 measures the pressure in the fuel gas passages and oxidant gas passages of a workpiece produced as a fuel cell stack 1 and/or the cell voltage of each cell when gas is supplied to the fuel gas inlet 55a and oxidant gas inlet 54a of the workpiece and/or a voltage is applied to the electrodes of the workpiece from an external DC power supply 8, and, based on these measurements, determines whether or not the workpiece is in any of a first erroneous assembly state in which a power generation cell 2 is laminated in a proper dummy position, a second erroneous assembly state in which a dummy cell 3 is laminated in a proper power generation position, a third erroneous assembly state which includes a first abnormal cell in which dummy MEAs 31 and power generation separators 22 are assembled, and a fourth erroneous assembly state which includes a second abnormal cell in which power generation MEAs 21 and dummy separators 32 are assembled.

The erroneous assembly inspection method according to the present embodiment exhibits the following effects.

(1) The erroneous assembly inspection method measures at least one of a pressure in the fuel gas passages and oxidant gas passages when gas is supplied to the fuel gas inlet 55a and oxidant gas inlet 54a of the workpiece, the cell voltage of each cell when gas is supplied to the fuel gas inlet 55a and oxidant gas inlet 54a, and the cell voltage of each cell when gas is supplied to the fuel gas inlet 55a and oxidant gas inlet 54a and an external voltage is applied to the electrodes of the workpiece, and, based on the measured result, determines whether or not the workpiece is in any of a first erroneous assembly state, a second erroneous assembly state, a third erroneous assembly state, and a fourth erroneous assembly state. This allows for determination of whether or not the workpiece has been properly produced as a fuel cell stack 1 without depending on the appearance of the workpiece.

(2) When hydrogen gas and oxidant gas are supplied respectively to the fuel gas inlet 55a and oxidant gas inlet 54a of the workpiece, the power generation cells 2 generate power, producing a cell voltage, whereas the dummy cells 3 do not produce a cell voltage. The cross leakage checking step utilizes this mechanism by measuring the cell voltage of each cell when hydrogen gas and air are supplied respectively to the fuel gas inlet 55a and oxidant gas inlet 54a of the workpiece, in order to determine whether or not a power generation cell is laminated in a proper dummy position in the workpiece, i.e. whether or not the workpiece is in the first erroneous assembly state, or whether or not a dummy cell is laminated in a proper power generation position in the workpiece, i.e. whether or not the workpiece is in the second erroneous assembly state. This allows for determination of whether or not the workpiece is in the first erroneous assembly state or the second erroneous assembly state without depending on the appearance of the workpiece.

(3) The dummy MEAs 31 have the function of transmitting gas between the anode and the cathode, and the dummy separators 32 do not have the function of supplying gas to the anode. The erroneous assembly inspection method utilizes such dummy MEAs 31 and dummy separators 32 to make it possible to see a difference in the measured results of the pressure and cell voltage in cases where the workpiece is in the third erroneous assembly state or the fourth erroneous assembly state compared to other cases. Therefore, according to the erroneous assembly inspection method, it is possible to determine whether or not the workpiece is in the third erroneous assembly state or the fourth erroneous assembly state without depending on the appearance of the workpiece.

(4) Unlike the power generation MEAs 21, the dummy MEAs 31 used in the dummy cells 3 have the function of transmitting gas between the anode and the cathode, and unlike the power generation separators 22, the dummy separators 32 do not have the function of supplying gas to the anode. Therefore, if a first abnormal cell produced by assembling dummy MEAs 31 and power generation separators 22 is present among the plurality of cells constituting the workpiece, i.e. if the workpiece is in the third erroneous assembly state, the oxidant gas passages and fuel gas passages are short-circuited in this first abnormal cell. Therefore, when inert gas is supplied at different pressures respectively to the fuel gas inlet 55a and oxidant gas inlet 54a, the gases will mix in the first abnormal cell, reducing the pressure difference between the fuel gas passages and the oxidant gas passages. The pressure inspection step utilizes this mechanism to allow for determination of whether or not the workpiece is in the third erroneous assembly state without depending on the appearance of the workpiece.

(5) If a second abnormal cell produced by assembling power generation MEAs 21 and dummy separators 32 is present among the plurality of cells constituting the workpiece, i.e. if the workpiece is in the fourth erroneous assembly state, hydrogen gas will not be supplied to the anodes of the power generation MEAs 21 of the second abnormal cell even if hydrogen gas is supplied to the fuel gas inlet 55a of the workpiece. In addition, when there is no hydrogen gas present at the anode of the power generation MEA 21, resistance is greater than when hydrogen gas is present at the anode of the power generation MEA 21. Therefore, when an external voltage is applied to a workpiece including such a second abnormal cell, there will be a difference between the cell voltage of the power generation cell 2, the cell voltage of the dummy cell 3, and the cell voltage of the second abnormal cell. The aging step utilizes this mechanism by measuring the cell voltage of each cell when hydrogen gas and inert gas are supplied respectively to the fuel gas inlet 55a and oxidant gas inlet 54a and a voltage is applied from the external DC power supply 8 to the electrodes of the workpiece, allowing for determination of whether or not the workpiece is in the fourth erroneous assembly state without depending on the appearance of the workpiece.

(6) If the workpiece is in the third erroneous assembly state as described above, the anode gas passages and cathode gas passages in the first abnormal cell included in the workpiece will be short-circuited. Therefore, in the erroneous assembly inspection method, hydrogen gas and air are supplied respectively to the fuel gas inlet 55a and oxidant gas inlet 54a after it has been determined that the workpiece is not. in the third erroneous assembly state, i.e. that the fuel gas passages and oxidant gas passages of the workpiece are not short-circuited. This makes it possible to prevent hydrogen gas and air from mixing during inspection.

(7) when hydrogen gas and oxidant gas are supplied respectively to the fuel gas inlet 55a and oxidant gas inlet 54a of the workpiece, the power generation cells 2 generate power, producing a cell voltage, whereas the dummy cells 3 do not produce a cell voltage. The cross leakage checking step utilizes this mechanism by measuring the cell voltage of each cell when hydrogen gas and air are supplied respectively to the fuel gas inlet 55a and oxidant gas inlet 54a of the workpiece, in order to determine whether or not a power generation cell 2 is laminated in a proper dummy position in the workpiece or whether or not a dummy cell 3 is laminated in a proper power generation position in the workpiece. This allows for determination of whether or not the power generation cells 2 and dummy cells 3 are laminated in proper positions without depending on the appearance of the workpiece.

In an inspection known as a cross leakage check, changes in cell voltage when hydrogen gas and air are sealed respectively in the fuel gas passages and oxidant gas passages of the workpiece are monitored to determine whether there is any leakage of hydrogen gas from the anode side to the cathode side of the power generation cell 2. According to the erroneous assembly inspection method, utilizing such a cross leakage check allows for determining not only the presence of leakage but also erroneous assembly.

(8) Unlike the power generation MEAs 21, the dummy MEAs 31 used in the dummy cells 3 have the function of transmitting gas between the anode and the cathode, and unlike the power generation separators 22, the dummy separators 32 do not have the function of supplying gas to the anode. Therefore, if a first abnormal cell produced by assembling dummy MEAs 31 and power generation separators 22 is present among the plurality of cells constituting the workpiece, the fuel gas passages and oxidant gas passages are short-circuited in this first abnormal cell. Therefore, when inert gas is supplied at different pressures respectively to the fuel gas inlet 55a and oxidant gas inlet 54a, the gases will mix in the first abnormal cell, reducing the pressure difference between the fuel gas passages and the oxidant gas passages. The pressure inspection step utilizes this mechanism to allow for determination of whether or not the workpiece includes a first abnormal cell as described above without depending on the appearance of the workpiece.

(9) If a second abnormal cell produced by assembling power generation MEAs 21 and dummy separators 32 is present among the plurality of cells constituting the workpiece, hydrogen gas will not be supplied to the anodes of the power generation MEAs 21 of the second abnormal cell even if hydrogen gas is supplied to the fuel gas inlet 55a of the workpiece. In addition, when there is no hydrogen gas present at the anode of the power generation MEA 21, resistance is greater than when hydrogen gas is present at the anode of the power generation MEA 21. Therefore, when a voltage is applied from the external DC power supply to a workpiece including such a second abnormal cell, there will be a difference between the cell voltage of the power generation cell 2, the cell voltage of the dummy cell 3, and the cell voltage of the second abnormal cell. The aging step utilizes this mechanism by measuring the cell voltage of each cell when hydrogen gas and inert gas are supplied respectively to the fuel gas inlet 55a and oxidant gas inlet 54a and a voltage is applied from the external DC power supply 8 to the electrodes of the workpiece, allowing for determination of whether or not the workpiece includes a second abnormal cell without depending on the appearance of the workpiece.

In the aging step for improving output of the assembled fuel cell stack, hydrogen gas and inert gas may be supplied respectively to the fuel gas passages and oxidant gas passages of the workpiece and a voltage may be applied from the external DC power supply 8 to the electrodes of the workpiece. According to the erroneous assembly inspection method, utilizing such an aging step allows for determining whether or not the workpiece includes a second abnormal cell, while improving the output of the workpiece if it does not include a second abnormal cell.

An embodiment of the present invention is described above, but the present invention is not so limited. The detailed structures may be suitably changed without departing from the spirit and scope of the present invention.

What is claimed is:

1. A method of inspection for erroneous assembly of a fuel cell stack produced by stacking, in predetermined proper power generation positions and proper dummy positions, a power generation cell produced by assembling a power generation MEA and a power generation separator having passages for supplying gas to an anode and a cathode of the power generation MEA, and a dummy cell produced by assembling a dummy MEA having different functions than the power generation MEA and a dummy separator having different functions than the power generation separator, the method comprising the steps of:

measuring at least one of a pressure in anode gas passages and cathode gas passages of a workpiece which is a laminated body of a plurality of cells when gas is supplied to an anode gas inlet and a cathode gas inlet of the workpiece, a cell voltage of each cell when gas is supplied to the anode gas inlet and the cathode gas inlet, and a cell voltage of each cell when gas is supplied to the anode gas inlet and the cathode gas inlet and an external voltage is applied to electrodes of the workpiece; and based on a result of the measurement, determining whether or not the workpiece is in any of a first erroneous assembly state in which the power generation cell is laminated in the proper dummy position, a second erroneous assembly state in which the dummy cell is laminated in the proper power generation position, a third erroneous assembly state including a first abnormal cell in which the dummy MEA and the power generation separator are assembled, arid a fourth erroneous assembly state including a second abnormal cell in which the power generation MEA and the dummy separator are assembled.

2. The method of inspection for erroneous assembly of a fuel cell stack according to claim 1, wherein, by measuring a cell voltage of each cell when an anode gas and a cathode gas are supplied respectively to the anode gas inlet and the cathode gas inlet, it is determined whether or not the workpiece is in the first or the second erroneous assembly state.

3. The method of inspection for erroneous assembly of a fuel cell stack according to claim 1, wherein the dummy MEA has a function of transmitting gas between the anode and the cathode, and the dummy separator does not have a function of supplying gas to the anode.

4. The method of inspection for erroneous assembly of a fuel cell stack according to claim 2, wherein the dummy MEA has a function of transmitting gas between the anode and the cathode, and the dummy separator does not have a function of supplying gas to the anode.

5. The method of inspection for erroneous assembly of a fuel cell stack according to claim 3, wherein, by measuring a pressure difference between the anode gas passages and the cathode gas passages when gas is supplied at different pressures respectively to the anode gas inlet and the cathode gas inlet, it is determined whether or not the workpiece is in the third erroneous assembly state.

6. The method of inspection for erroneous assembly of a fuel cell stack according to claim 4, wherein, by measuring a pressure difference between the anode gas passages and the cathode gas passages when gas is supplied at different pressures respectively to the anode gas inlet and the cathode gas inlet, it is determined whether or not the workpiece is in the third erroneous assembly state.

7. The method or inspection for erroneous assembly of a fuel cell stack according to claim 3, wherein, by measuring a cell voltage of each cell when anode gas and inert gas are supplied respectively to the anode gas inlet and the cathode gas inlet and an external voltage is applied to the electrodes, it is determined whether or not the workpiece is in the fourth erroneous assembly state.

8. The method of inspection for erroneous assembly of a fuel cell stack according to claim 4, wherein, by measuring a cell voltage of each cell when anode gas and inert gas are supplied respectively to the anode gas inlet and the cathode gas inlet and an external voltage is applied to the electrodes, it is determined whether or not the workpiece is in the fourth erroneous assembly state.

9. The method of inspection for erroneous assembly of a fuel cell stack according to claim 5, wherein, by measuring a cell voltage of each cell when anode gas and inert gas are supplied respectively to the anode gas inlet and the cathode gas inlet and an external voltage is applied to the electrodes, it is determined whether or not the workpiece is in the fourth erroneous assembly state.

10. The method of inspection for erroneous assembly of a fuel cell stack according to claim 6, wherein, by measuring a cell voltage of each cell when anode gas and inert gas are supplied respectively to the anode gas inlet and the cathode gas inlet and an external voltage is applied to the electrodes, it is determined whether or not the workpiece is in the fourth erroneous assembly state.

11. The method of inspection for erroneous assembly of a fuel cell stack according to claim 3, wherein, after it has been determined that the workpiece is not in the third erroneous assembly state, anode gas and cathode gas are supplied respectively to the anode gas inlet and the cathode gas inlet.

12. The method of inspection for erroneous assembly of a fuel cell stack according to claim 4, wherein, after it has been determined that the workpiece is not in the third erroneous assembly state, anode gas and cathode gas are supplied respectively to the anode gas inlet and the cathode gas inlet.

13. The method of inspection for erroneous assembly of a fuel cell stack according to claim 5, wherein, after it has been determined that the workpiece is not in the third erroneous assembly state, anode gas and cathode gas are supplied respectively to the anode gas inlet and the cathode gas inlet.

14. The method of inspection for erroneous assembly of a fuel cell stack according to claim 6, wherein, after it has been determined that the workpiece is not in the third erroneous assembly state, anode gas and cathode gas are supplied respectively to the anode gas inlet and the cathode gas inlet.

15. The method of inspection for erroneous assembly of a fuel cell stack according to claim 7, wherein, after it has been determined that the workpiece is not in the third erroneous assembly state, anode gas and cathode gas are supplied respectively to the anode gas inlet and the cathode gas inlet.

16. The method of inspection for erroneous assembly of a fuel cell stack according to claim 8, wherein, after it has been determined that the workpiece is not in the third erroneous assembly state, anode gas and cathode gas are supplied respectively to the anode gas inlet and the cathode gas inlet.

17. The method of inspection for erroneous assembly of a fuel cell stack according to claim 9, wherein, after it has been determined that the workpiece is not in the third erroneous assembly state, anode gas and cathode gas are supplied respectively to the anode gas inlet and the cathode gas inlet.

18. A method of inspection for erroneous assembly of a fuel cell stack produced by stacking, in predetermined proper power generation positions and proper dummy positions, a power generation cell produced by assembling a power generation MEA and a power generation separator having passages for supplying gas to an anode and a cathode of the power generation MEA, and a dummy cell produced by assembling a dummy MEA having different functions than the power generation MEA and a dummy separator having different functions than the power generation separator, the method comprising:

measuring a cell voltage of each cell when anode gas and cathode gas are supplied respectively to an anode gas inlet and a cathode gas inlet of the workpiece which is a laminated body of a plurality of cells to determine whether or not the power generation cell is laminated in the proper dummy position in the workpiece, or whether or not the dummy cell is laminated in the proper power generation position.

19. A method of inspection for erroneous assembly of a fuel cell stack produced by stacking, in predetermined proper positions, a power generation cell produced by assembling a power generation MEA and a power generation separator having passages for supplying gas to an anode and a cathode of the power generation MEA, and a dummy cell produced by assembling a dummy MEA which unlike the power generation MEA has a function of transmitting gas between the anode and the cathode and a dummy separator which unlike the power generation separator does not have a function of supplying gas to the anode, the method comprising:

measuring a pressure difference between anode gas passages and cathode gas passages of the workpiece which is a laminated body of a plurality of cells when gas is supplied at different pressures respectively to an anode gas inlet and a cathode gas inlet of the workpiece to determine whether or not the workpiece includes a first abnormal cell in which the dummy MEA and the power generation separator are assembled.

20. A method of inspection for erroneous assembly of a fuel cell stack produced by stacking, in predetermined proper positions, a power generation cell produced by assembling a power generation MEA and a power generation separator having passages for supplying gas to an anode and a cathode of the power generation MEA, and a dummy cell produced by assembling a dummy MEA which unlike the power generation MEA has a function of transmitting gas between the anode and the cathode and a dummy separator which unlike the power generation separator does not have a function of supplying gas to the anode, the method comprising:

measuring a cell voltage of each cell when anode gas and inert gas are supplied respectively to an anode gas inlet and a cathode gas inlet of the workpiece which is a laminated body of a plurality of cells, and an external voltage is applied to electrodes of the workpiece, to determine whether or not the workpiece includes a second abnormal cell in which the power generation MEA and the dummy separator are assembled.

\* \* \* \* \*